United States Patent [19]
Kambe

[11] 3,843,004
[45] Oct. 22, 1974

[54] LOADING TOOL CONTROL APPARATUS FOR LOADING VEHICLES

[75] Inventor: Osamu Kambe, Osaka, Japan

[73] Assignee: Toyo Umpanki Co., Ltd., Osaka, Japan

[22] Filed: July 20, 1973

[21] Appl. No.: 381,135

[52] U.S. Cl. .................................. 214/763, 214/152
[51] Int. Cl. .................................. B66f 9/00
[58] Field of Search ............ 214/762, 763, 764, 152

[56] References Cited

UNITED STATES PATENTS

| | | | |
|---|---|---|---|
| 2,876,921 | 3/1959 | Salna | 214/763 |
| 3,009,590 | 11/1961 | Kampert | 214/763 |

*Primary Examiner*—Robert J. Spar
*Assistant Examiner*—Lawrence J. Oresky
*Attorney, Agent, or Firm*—Sughrue, Rothwell, Mion, Zinn and Macpeak

[57] ABSTRACT

A loading tool control apparatus for use with a loading vehicle includes a lift arm which has its front end hinged to a loading tool and the other hinged to a main body of the loading vehicle for raising and descending the loading tool. The loading tool control apparatus has such a simple construction as a plurality of oil pressure cylinder mechanisms, which have fluid communication with each other, but the apparatus can reliably prevent the so-called "roll-back phenomenon" of the loading tool without resorting to complicated mechanical linkages. At least one piston of the oil pressure cylinder mechanisms is provided with an oil leakage compensation mechanism of the valve type, so that the associated actions can be reliably transmitted between the oil pressure cylinder mechanisms.

5 Claims, 9 Drawing Figures

19
6
63
11
20
1
16
51
17
15
23
13
14
3
4
2
35
12
5
21
18

110
106
6
19
111
IV
11
20
1a
107
V
113
109
III
101
IV
16
108
105
V
17
51
104
103
63
112
III
3
5
15
23
35
102
18
1b
4
2
12
21

108
109
104
1a
112
103
1b
102
105

110
101
106
1b
1a
113
102

104
101
1b
1a
102
105

P
T
10
A
B
7
6
63
62
61
8
7
9
200
231
3
33
35
232
34
C
31
32

LOADING TOOL CONTROL APPARATUS FOR LOADING VEHICLES

BACKGROUND OF THE INVENTION

1. Field of the Invention

The present invention relates to a loading tool control apparatus for use with a loading vehicle, and, more particularly, to a loading tool control apparatus for use with a loading vehicle including a lift arm which has its front end hinged to a loading tool and the other hinged to a main body of the loading vehicle for raising and lowering the loading tool, so that the control apparatus may prevent the so-called "roll-back phenomenon" during the raising and lowering operation of the loading tool.

2. Description of the Prior Art

A conventional loading vehicle is known to include a lift arm which has its front end hinged to a loading tool such as a shovel or a fork and the other hinged to a main body of the loading vehicle so as to raise and lower the loading tool. One of the major problems concomitant with such conventional loading vehicle is the so-called "roll-back phenomenon," in which the loading tool is excessively tilted backward during the raising operation of the lift arm while it is excessively tilted forward during the lowering operation. If this roll-back of the loading tool is overly large, the cargo on the loading tool will get out of shape or fall to the driver's seat during the ascending operation of the lift arm. This is markedly dangerous, as will be easily understood.

The loading mechanism for the conventional loading vehicle of this kind employs mechanical linkages such as link mechanisms of inverted "Z" shape. Such link mechanisms cannot, however, be completely free from the roll-back phenomenon of the loading tool. When, moreover, the loading vehicle is used at a place where it cannot be moved for the loading operation, it is naturally considered convenient that the lift arm is made extendible and contractible. However, the conventional link mechanisms can not give a satisfactory answer to the above requirement. Although it cannot be concluded absolutely impossible that both of the extendible and contractible lift arm and the prevention of the roll-back phenomenon can be attained by a suitable combination of link mechanisms, the successful link mechanisms will then be highly complicated and enlarged.

SUMMARY OF THE INVENTION

It is, therefore, a primary object of the present invention to provide an improved loading tool control apparatus for use with a loading vehicle including a lift arm which has its front end hinged to a loading tool and the other hinged to a main body of the loading vehicle for raising and lowering the loading tool, so that the control apparatus may prevent the so-called "roll-back phenomenon" of the loading tool during the raising operation of the lift arm, thereby keeping the base of the loading tool horizontal.

Another object of the present invention is to provide an improved loading tool control apparatus in which the loading tool is kept free from the roll-back phenomenon with its base being kept horizontal even if an extendible and contractible lift arm is employed in the loading vehicle of the above type.

Still another object of the invention is to provide an improved loading tool control apparatus of the above type in which oil pressure cylinder mechanisms are used for controlling the loading tool of the above loading vehicle without resorting to the conventional mechanical linkages.

A further object of the invention is to provide an improved loading tool control apparatus of the above type which can finely control the operations or movements of the loading tool.

A further object of the invention is to provide an improved loading tool control apparatus of the above type in which at least one oil pressure cylinder mechanism has its cylinder provided with an oil leakage compensation mechanism.

A further object of the invention is to provide an improved loading tool control apparatus of the above type which is of simple construction as is easily manufactured.

In order to accomplish the above objects, the present loading tool control apparatus for use with a loading vehicle comprises: a lift arm having its front end hinged to a lower portion of the rear of the loading tool and its rear end hinged to a main body of the loading vehicle for swinging thereabout to raise and lower the loading tool; a tilting cylinder mechanism having its one end attached to a center portion of said lift arm by means of a holding member and the other end hinged to an upper portion of the rear of the loading tool, said tilting cylinder mechanism including a cylinder, front and rear pistons slidably accommodated in said cylinder for defining front, intermediate and rear cylinder chambers, and front and rear piston rods respectively secured to said front and rear pistons, the foremost end of said front piston rod forming the one end of said tilting cylinder mechanism and the rear end of said cylinder forming the other end of said tilting cylinder mechanism for controlling tilt of the loading tool; a boom cylinder mechanism having its one end hinged to the main body of the loading vehicle and the other hinged to that portion of said lift arm, which is positioned close to the main body of the loading vehicle, for raising and lowering said lift arm; a level cylinder mechanism having its one end hinged to the main body of the loading vehicle and the other hinged to a central portion of said lift arm and extendible and contractible in response to rise and fall of said lift arm; an oil pump for supplying oil to said tilting, boom and level cylinder mechanisms, an oil reservoir having fluid communication with said oil pump; and an oil pressure change-over valve assembly interposed between said tilting and level cylinder mechanisms and said oil pump and oil reservoir and formed with first and second oil ports, the front cylinder chamber of said tilting cylinder mechanism and a front cylinder chamber of said level cylinder mechanism being in fluid communication with each other by way of an oil conduit and with the first oil port of said oil pressure change-over valve assembly, the intermediate cylinder chamber of said tilting cylinder mechanism being in fluid communication with the second oil port of said oil pressure change-over valve assembly by way of an oil conduit, the rear cylinder chamber of said level cylinder mechanism and the rear cylinder chamber of said tilting cylinder mechanism being in fluid communication with each other by way of an oil conduit, and the front and rear pistons and the front and rear piston rods of said tilting cylinder mechanism being concurrently brought into sliding movement in the cylinder of said tilting cylinder mechanism in response to the extension and contraction of said level cylinder mechanism.

BRIEF DESCRIPTION OF THE DRAWINGS

Other objects and advantages of the present invention will be apparent from the following description taken in conjunction with the accompanying drawings, in which.

DETAILED DESCRIPTION OF THE PREFERRED EMBODIMENTS

Figure 1:
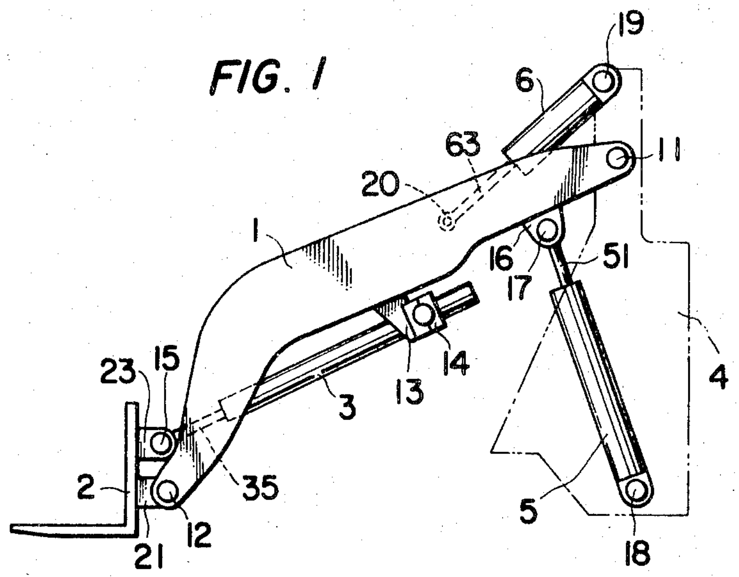
FIG. 1 is a side elevation of a loading tool control apparatus according to the present invention, which apparatus is used with a loading vehicle including a lift arm having its front end hinged to a loading tool and the other hinged to a main body of the loading vehicle for raising and lowering the loading tool.

The first embodiment of the present invention will now be described with reference to FIG. 1. Indicated at reference numeral 1 is a lift arm which has its one end hinged to a main body 4 of a loading vehicle through a shaft 11. This lift arm 1 has the other end hinged to a loading tool 2 such as a fork or a shovel through a bracket 21 and a shaft 12, both of which are secured to a lower portion of a rear of the loading tool 2. To a center portion of this lift arm 1 is attached a body of a tilting cylinder mechanism 3 through a bracket 13 and a holding member 14, both of which are secured to the lift arm 1. This tilting cylinder mechanism 3 operates to always keep the base of the loading tool 2 horizontal, and includes a front piston rod 35 which has its front end hinged to the loading tool 2 through a bracket 23 and a shaft 15 secured to an upper portion of the rear of the loading tool 2. Designated by reference numeral 5, is a boom cylinder mechanism for raising and lowering the lift arm 1. This boom cylinder mechanism 5 has the leading end of its piston rod 51 hinged to the lift arm 1 through a bracket 16 and a shaft 17, both of these being secured to that portion of the lift arm 1 which is positioned close to the main body 4. The other end of the boom cylinder mechanism 5 is, however, hinged to the vehicle main body 4 through a shaft 18. Designated by reference numeral 6, is a level cylinder mechanism which is extendible and contractible in response to raise and fall of the lift arm 1. This level cylinder mechanism 6 has its cylinder end hinged to the vehicle main body 4 through a shaft 19 and the front end of its piston rod 63 hinged to a central portion of the lift arm 1 through a shaft 20.

Figure 6:
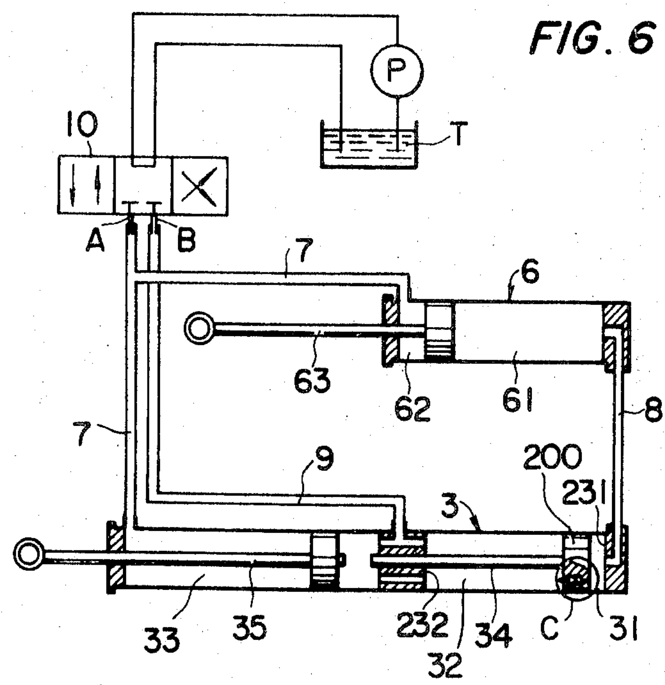
FIG. 6 is a diagramatical representation of an oil circuit as used in the loading tool control apparatus of FIGS. 1 and 2.

Turning now to FIG. 6, the tilting cylinder mechanism 3 and the level cylinder mechanism 6 respectively are provided with front cylinder chambers 33 and 62, which are in fluid communication with each other by way of an oil conduit 7. These cylinder chambers 33 and 62 are in further fluid communication with a first oil port A of an oil pressure change-over valve assembly 10, which is interposed between the tilting and level cylinder mechanisms 3 and 6 and an oil pump P and an an oil reservoir T so as to control tilt of the loading tool 2. The tilting cylinder mechanism 3 is formed with an intermediate cylinder chamber 32 which is in fluid communication with a second oil port B of the change-over valve assembly 10 by way of an oil conduict 9. The level cylinder mechanism 6 and the tilting cylinder mechanism 3 are formed with rear cylinder chambers 61 and 31, which are in fluid communication with each other by way of an oil conduit 8. Thus, the tilting cylinder mechanism 3 has its rear piston rod 34 made slidable within the intermediate cylinder chamber 32 thereof in response to the extension and contraction of the level cylinder 6, which in turn takes place in response to the ascent and descent of the lift arm 1.

Figure 2:
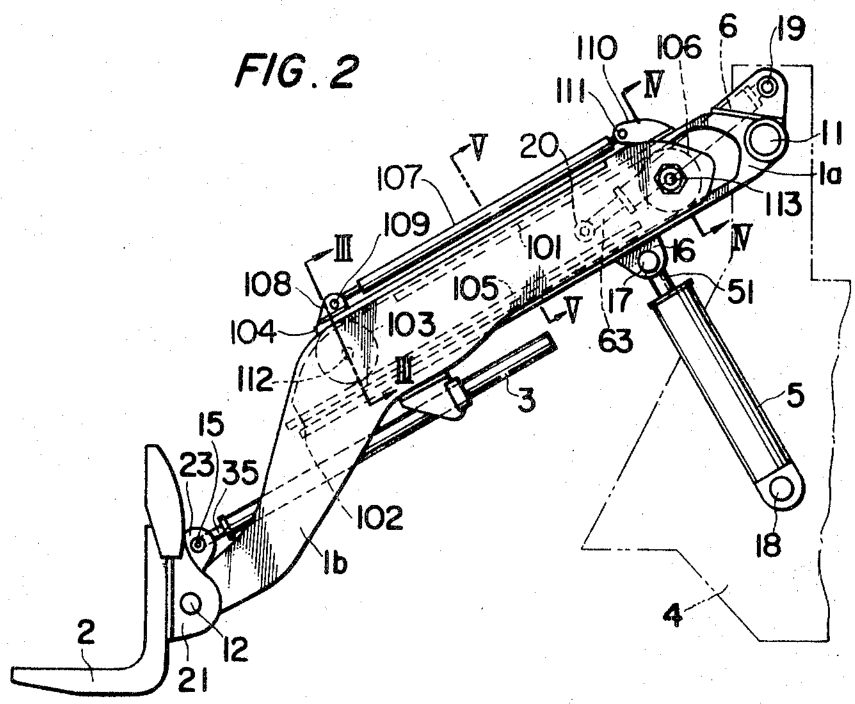
FIG. 2 is similar to FIG. 1 but shows another embodiment of the present invention, in which apparatus the lift arm is made extendible and contractible.

Reference will now be made to FIG. 2, in which another embodiment of the present loading tool control apparatus is also applied to a loading vehicle. This second embodiment is similar to the first embodiment of FIG. 1 with a slight exception that the lift arm itself is extendible and contractible, and accordingly like reference numerals will indicate like elements and parts of FIG. 1, the repeated description of which will be omitted here.

Figure 3:
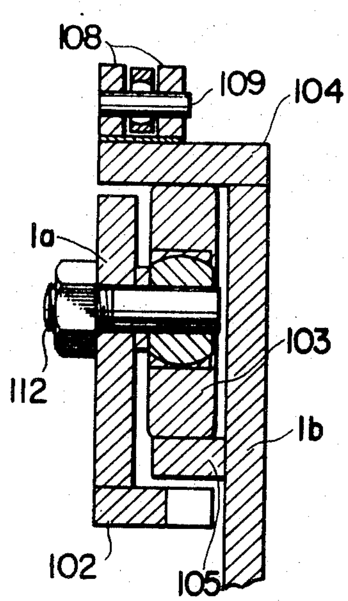
FIGS. 3, 4 and 5 are sections taken respectively along the lines III — III, IV — IV and V — V of FIG. 2.
Figure 4:
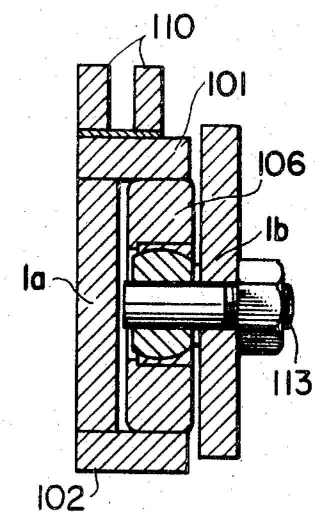
Figure 5:
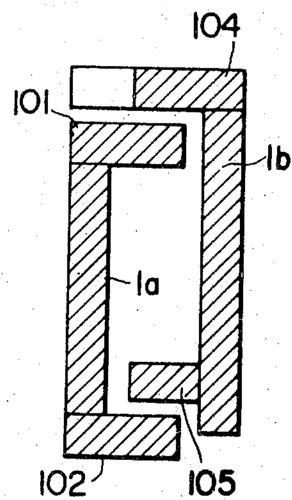

Additionally resorting to FIGS. 3, 4 and 5, the construction of the extendible and contractible lift arm will be detailed in the following. This modified lift arm includes a stationary lift arm 1a formed at its both sides with longitudinally extending flange portions 101 and 102 and having its one end hinged to the vehicle main body 4 through the shaft 11 and the other rotatably bearing a roller 103 through a shaft 112. The lift arm also includes a movable lift arm member 1b which is formed at its both ends with longitudinally extending flange portions 104 and 105. These flange portions 104 and 105 are engaged with the roller 103 which is born on the end of the stationary lift arm member *1a*. The movable lift arm member *1b* is constructed to have its one end hinged to the loading tool 2 through the bracket 21 and the shaft 12 which is secured to the lower portion of the rear of the loading tool 2. The other end of this movable lift arm member *1b* bears through a shaft 113 a roller 106 which is rotatably engaged with the inner surfaces of the flange portions 101 and 102 of the stationary lift arm member *1a*. Indicated by reference numeral 107 is, on the other hand, an oil pressure cylinder mechanism which is operative to extend and contract the movable lift arm under consideration. This oil pressure cylinder mechanism 107 is constructed to have its one end secured through a shaft 109 to a bracket 108 which in turn is secured to the movable lift arm member *1b*. This oil pressure cylinder mechanism 107 has its other end secured through a shaft 111 to a bracket 110 which in turn is secured to the stationary lift arm member *1a*. With these construction arrangements, the movable lift arm member *1b* is made extendible and contrctible along the stationary lift arm member $1a$ by way of the flange portions 101, 102, 104 and 105 and of the rollers 103 and 106. The extension and contraction of the movable lift arm member $1b$ is effected by the extending and contracting motions of the oil pressure cylinder mechanism 107 which can be actuated by a suitable oil pump (not shown).

The operation of the present loading tool control apparatus as exemplified in FIGS. 1 and 2 will be described in connection with FIG. 6, in which the front end of the lift arm 1 is shown at a lowered condition, by way of example only.

When, in operation, the piston rod 51 of the boom cylinder mechanism 5 is extended, the front end of the lift arm 1 is raised or lifted together with the loading tool 2 attached thereto, while the piston rod 63 of the level cylinder mechanism 6 is contracted or shrunk. When the latter occurs, the oil which has been contained in the rear cylinder chamber 61 of the level cylinder mechanism 6 is discharged to flow into the rear cylinder chamber 31 of the tilting cylinder mechanism 3. Then, the rear piston rod 34 of the tilting cylinder mechanism 3 will be moved forward, and accordingly the front piston rod 35 of the same will also be moved forward. When this piston rod 35 is extended forward, the loading tool 2 will accordingly be tilted forward as it is raised. This is because the front end of the piston rod 35 is hinged to the upper rear of the loading tool 2. The extent of tilt of the loading tool 2 is so controlled as to have its base maintained horizontal.

When, on the other hand, the piston rod 51 of the boom cylinder mechanism 5 is contracted with the front end of the lift arm 1 being elevated, then the particular front end will begin to sink and the piston rod 63 of the level cylinder mechanism 6 will be extended. Then, the oil having occupied the front chamber 62 of the level cylinder mechanism 6 will be accordingly discharged to flow into the front chamber 33 of the tilting cylinder mechanism 3, so that the front piston rod 35 of the same will be returned or moved backward. As a result, the front piston rod 35 will be contracted to draw back the upper rear of the loading tool 2. Thus, the base of the loading tool 2 can be maintained horizontal. When, moreover, the change-over valve assembly 10 is shifted leftwardly of FIG. 6 independently of the operation of the boom cylinder mechanism 5, then oil under pressure is introduced from the oil pump P into the front chamber 33 of the tilting cylinder mechanism 3 to contract its front piston rod 35. As a result, the base of the loading tool 2 is tilted backward. At this instant, the oil in the intermediate cylinder chamber 32 of the tilting cylinder mechanism 3 will be returned to the oil reservoir T.

When, on the contrary, the change-over valve assembly 10 is shifted rightwardly, the pressurized oil is supplied from the oil pump P to the intermediate chamber 32 of the tilting cylinder mechanism 3 to move the front piston rod 35 in the forward direction, so that the loading tool 2 will be tilted forward. In this meanwhile, the oil having occupied the front chamber 33 of the tilting cylinder mechanism 3 will be discharged to the oil reservoir T.

It should be noted here that the pressure of oil involved in this oil circuit can be maintained at a predetermined constant level if the cylinders of the tilting and level cylinder mechanisms 3 and 6 have an identical internal diameter and if the rear and front piston rods 34 and 35 of the mechanism 3 and the piston rod 63 of the mechanism 6 have an identical diameter. If, moreover, the hinged positions of the level cylinder mechanism 6 to the vehicle main body 4 and to the lift arm 1 are suitably controlled, the obtainable stroke of the level cylinder mechanism 6 will be selected at an accordingly suitable level, which in turn affords suitable selection of angle for compensating the roll-back phenomenon. In case the extendible and contractible lift arm of FIG. 2 is employed in the present loading tool control apparatus, still moreover, it should be appreciated that the loading tool 2 can be moved along a vertical plane, not to mention that it can be maintained horizontal at all times.

Figure 7:
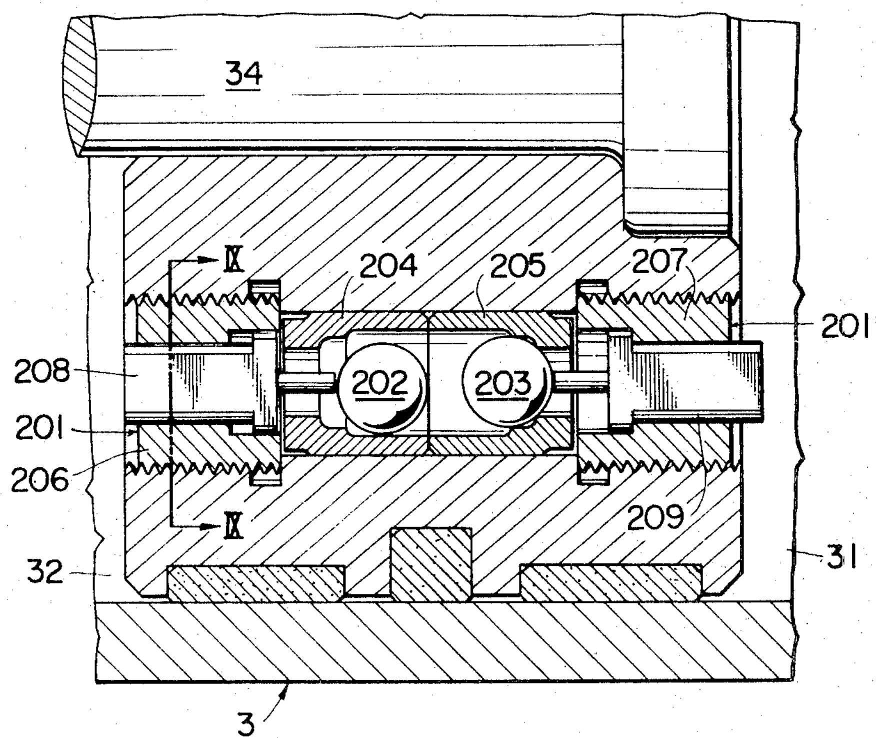
FIG. 7 is an enlarged sectional view showing an oil leakage compensation mechanism as mounted in a piston portion C of FIG. 6.

Turning now to FIG. 7, an oil leakage compensation mechanism, which is shown in an enlarged sectional view of the portion C of FIG. 6, is mounted in at least one piston of the present loading tool control apparatus.

In the present apparatus employing a plurality of oil pressure cylinder mechanisms which are communicated with each other, all the cylinders of all the cylinder mechanisms are required to have a common constant level of oil pressure. Especially, in order to ensure cooperation of the level cylinder mechanism 6 with the tilting cylinder mechanism 3, both mechanisms are required to have their cylinders of the same inside diameter and to have their piston rods of the same diameter. At the same time, these two mechanisms 3 and 6 are required to have a constant oil capacity. These requirements could not, however, be satisfied by the conventional cylinder mechanism, in which the repeated reciprocal movements of the piston in the cylinder will invite oil leakage between the outer periphery of the piston and the inner periphery of the cylinder so that complete power transmission could not be expected to lead to deteriorated operation. This difficulty can be cleared by mounting the oil leakage compensation mechanism of FIG. 7 in at least one piston of either or both the level cylinder mechanism 6 and the tilting cylinder mechanism 3.

Reverting to FIG. 6, the oil circuit exemplifies a case where the oil leakage compensation mechanism is mounted in the rear piston of the tilting cylinder mechanism 3.

Figure 9:
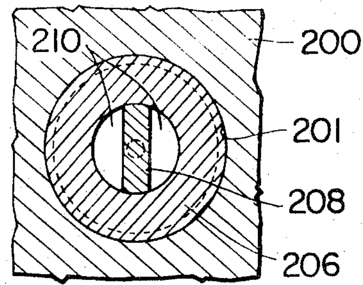
FIG. 9 is a partially cross-sectional view of the oil leakage compensation mechanism taken along the line IX — IX of FIG. 7.
Figure 8:
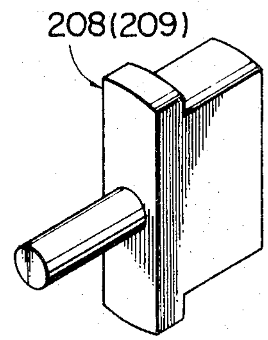
FIG. 8 is a perspective view showing a valve releasing member as used in the oil leakage compensation mechanism of FIG. 7.

In FIG. 7 showing the C portion of FIG. 6 is an enlarged scale, a pair of valve bores 201 are formed in at least one side portion of the piston 200. These valve bores 201 are arranged to have fluid communication with each other. In these valve bores 201, on the other hand, are inserted a pair of valve main bodies, which are composed of valve seat bodies 204 and 205 and of ball valve bodies 202 and 203 accommodated in the valve seat bodies 204 and 205. The outer ends of the valve main bodies are formed with threaded portions which are positioned at the sides of the valve bores 201, and into which a pair of screw members 206 and 207 are inserted for retaining the valve mainbodies in the valve bores 201. Each of these screw members 206 and 207 is formed with an axially through bore 210, within which each of paired valve releasing members 208 and 209 is axially slidably accommodated. It is desirable that the shape of the valve releasing members 208 and 209 are made such as shown in FIG. 8 so as not to block the through bore 210. With this shape, the cross-section of the particular bore 210 will be such as shown in FIG. 9.

With these construction arrangements, the present oil leakage compensation mechanism will operate in such a manner as follows.

When, in FIGS. 6 and 7, the piston 200 is moved by the oil pressure, which is accumulated in the intermediate chamber 32 of the tilting cylinder mechanism 3, from a cap side stroke end 232 to the tail side stroke end 231, then the ball valve body 202 at the side of the intermediate chamber 32 is released by the above oil pressure from the seating engagement with the valve seat bodies 204 and the ball valve body 203 of the rear chamber 31 is brought by the same oil pressure into seating engagement with the valve seat body 205, so that the two cylinder chambers 32 and 31 are hermetically sealed from each other. At this particular instant, the extending end of the valve releasing member 209 at the side of the rear chamber 31 is projecting from the outer end of the piston 200, as shown. When, under this condition, the piston 200 reaches the tail side stroke end 231 of the rear chamber 31, the projecting end of the valve reasing member 209 at the side of the rear chamber 31 will hit the tail side stroke end 231, with the resultant sliding movement of the valve reasing member 209 in the valve bore 201 toward the intermediate chamber 32. As a result, the ball valve body 203 at the side of the rear chamber 31 is released from the seating engagement with the valve seat body 205, so that the intermediate chamber 32 is communicated with the rear chamber 31 or the rear chamber 61 of the level cylinder mechanism 6. In this way, the working oil will be allowed to flow from the cylinder chamber of high pressure side to the cylinder chamber of low pressure side by way of the valve bore 201 and of the vlave main body, thus compensating the pressure differential between the above two chambers. When, on the contrary, the piston 200 is moved from the tail side stroke end 231 of the rear chamber 31 to the cap side stroke end 232, then the operations of the paired valve main bodies and of the valve releasing members are just the opposite to those of the above but will produce similar resultant effects in their substance.

Here, the pressure variations in the cylinder chambers take place not only due to the above-described oil leakage between the outer periphery of the respective piston and the inner periphery of the corresponding cylinder, but also due to the innegligible inertia of the respective piston at the stroke ends. This latter cause can, however, be compensated by the oil leakage compensation mechanism. Thus, it should also be appreciated that the present loading tool control apparatus can finely control the movements of the loading tool 2 and the lift arm 1 or the stationary and movable lift arm members 1*a* and 1*b*.

What is claimed is:

1. A loading tool control apparatus for use with a loading vehicle, said apparatus comprising: a lift arm having its front end hinged to a lower portion at the rear of the loading tool and its rear end hinged to a main body of the loading vehicle for swinging thereabout to raise and lower the loading tool; a tilting cylinder mechanism having its one end attached to a center portion of said lift arm by means of a holding member and the other hinged to an upper rear portion of the loading tool, said tilting cylinder mechanism including a cylinder, front and rear pistons slidably accommodated in said cylinder for defining front, intermediate and rear cylinder chambers, and front and rear piston rods respectively secured to said front and rear pistons, the foremost end of said front piston rod forming the one end of said tilting cylinder mechanism and the rear end of said cylinder forming the other end of said tilting cylinder mechanism for controlling tilt of said loading tool; a boom cylinder mechanism having its one end hinged to the main body of the loading vehicle and the other hinged to that portion of said lift arm which is positioned close to the main body of the loading vehicle, for raising and lowering said lift arm; a level cylinder mechanism having its one end hinged to the main body of the loading vehicle and the other hinged to a central portion of said lift arm and extendible and contractible in response to rise and fall of said lift arm; an oil pump for supplying oil to said tilting, boom and level cylinder mechanisms; an oil reservoir in fluid communication with said oil pump; and an oil pressure change-over valve assembly interposed between said tilting and level cylinder mechanisms and said oil pump and oil reservoir and formed with first and second oil ports, the front cylinder chamber of said tilting cylinder mechanism and a front cylinder chamber of said level cylinder mechanism being in fluid communication with each other by way of an oil conduit and with the first oil port of said oil pressure change-over valve assembly, the intermediate cylinder chamber of said tilting cylinder mechanism being in fluid communication with the second oil port of said oil pressure change-over valve assembly by way of an oil conduit, the rear cylinder chamber of said level cylinder mechanism and the rear cylinder chamber of said tilting cylinder mechanism being in fluid communication with each other by way of an oil conduit, and the front and rear pistons and the front and rear piston rods of said tilting cylinder mechanism being concurrently brought into sliding movement by contact therebetween in the cylinder of said tilting cylinder mechanism in response to the extension and the contraction of said level cylinder mechanism. whereby the loading tool is maintained horizontal during the raising and lowering of said lift arm.

2. A loading tool control apparatus according to claim 1, wherein said lift arm includes: a stationary lift arm member formed at its both sides with longitudinally extending flange portions and having its one end hinged to the main body of the loading vehicle and the other end rotatably bearing a roller; a movable lift arm member having formed at its both sides longitudinally extending flange portions which are engaged with the roller born on said stationary lift arm member, said movable lift arm member having its one end hinged to the lower rear portion of the said loading tool and the other end rotatably bearing a roller which is engaged with the flange portions of said stationary lift arm member; and an oil pressure cylinder mechanism having its one end secured to said movable lift arm member and the other end secured to said stationary lift arm member, said movable lift arm member being extendible and contractible along said stationary lift arm member in response to extension and contraction of said oil pressure cylinder mechanism.

3. A loading tool control apparatus according to claim 1, wherein at least one piston of said tilting cylinder mechanism and of said level cylinder mechanism includes a valve mechanism forming an oil leakage compensation mechanism.

4. A loading tool control apparatus according to claim 3, wherein said valve mechanism includes a pair of valve bores formed in at least one side portion of said at least one piston and being in fluid communication with each other; a pair of valve main bodies, each inserted into said valve bores and each composed of a valve seat body and of a ball valve body accommodated in said valve seat body; a pair of screw members threaded into said valve bores and positioned at the outer ends of said valve main bodies, each of said screw members being formed with an axially through bore; and a pair of valve releasing members each slidably accommodated within the through bores of said screw members.

5. A loading tool control apparatus according to claim 1, wherein the cylinders of said tilting and level cylinder mechanisms have identical internal diameters, and wherein the piston rods of said tilting and level cylinder mechanisms have identical diameters.

* * * * *